US009096169B2

(12) United States Patent
Ohmura et al.

(10) Patent No.: US 9,096,169 B2
(45) Date of Patent: Aug. 4, 2015

(54) DC-DC CONVERTER AND VEHICULAR LAMP

(71) Applicant: KOITO MANUFACTURING CO., LTD., Minato-ku, Tokyo (JP)

(72) Inventors: Yasunobu Ohmura, Shizuoka (JP); Takayoshi Kitagawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/157,148

(22) Filed: Jan. 16, 2014

(65) Prior Publication Data

US 2014/0203705 A1     Jul. 24, 2014

(30) Foreign Application Priority Data

Jan. 21, 2013   (JP) .................... 2013-008120

(51) Int. Cl.
*B60Q 1/02* (2006.01)
*B60Q 1/04* (2006.01)
*H02M 1/44* (2007.01)
*H02M 3/156* (2006.01)

(52) U.S. Cl.
CPC . *B60Q 1/04* (2013.01); *H02M 1/44* (2013.01); *H02M 3/156* (2013.01)

(58) Field of Classification Search
CPC ......... H02M 1/44; H02M 3/156; H02M 3/00; H05K 1/165; H05K 1/141; H05K 1/144; B60Q 1/04; B60Q 1/2696; B60Q 3/0293; B60Q 1/1423; H05B 33/0815; H05B 33/0803

USPC ........ 363/65, 67, 97, 147; 323/222, 282, 285; 315/77, 294, 307, 312–314, 247, 82, 315/32; 362/249.06, 459

See application file for complete search history.

(56) References Cited

U.S. PATENT DOCUMENTS

| | | | | |
|---|---|---|---|---|
| 6,970,367 | B2* | 11/2005 | Takeshima et al. | 363/147 |
| 7,202,613 | B2* | 4/2007 | Morgan et al. | 315/312 |
| 7,557,521 | B2* | 7/2009 | Lys | 315/294 |
| 8,723,489 | B2* | 5/2014 | Parakulam et al. | 323/259 |

FOREIGN PATENT DOCUMENTS

JP     2008-198915 A     8/2008

\* cited by examiner

*Primary Examiner* — Haiss Philogene
(74) *Attorney, Agent, or Firm* — Sughrue Mion, PLLC

(57) ABSTRACT

A DC-DC converter includes a plurality of converter portions, each of which includes a switching circuit portion and a control circuit portion, the switching circuit portion being configured to obtain an output voltage by stepping up or stepping down an input voltage with a switching converter circuit including a switch element, a wound element, and a rectifier element, and the control circuit portion being configured to control the output voltage by controlling the switch element of the switching circuit portion. The plurality of converter portions are arranged on a single circuit board such that the switching circuit portion of each of the converter portions is not adjacent to the control circuit portion of each of a rest of the converter portions.

4 Claims, 4 Drawing Sheets

DC-DC CONVERTER AND VEHICULAR LAMP

INCORPORATION BY REFERENCE

The disclosure of Japanese Patent Application No. 2013-08120 filed on Jan. 21, 2013 including the specification, drawings and abstract is incorporated herein by reference in its entirety.

BACKGROUND OF THE INVENTION

1. Field of the Invention

The invention relates to a DC-DC converter, and a vehicular lamp provided with a lighting circuit that includes a DC-DC converter.

2. Description of Related Art

Various methods and circuit structures for a DC-DC converter for obtaining output voltage suitable for a load by stepping up or stepping down input voltage from a direct-current power supply are known. A structure that has a circuit portion as a switching regulator and a control circuit portion that performs switching control thereof is widely used as such a DC-DC converter. In some cases, a plurality of these kinds of DC-DC converters are arranged on a single circuit board. For example, a lighting circuit structure that generates with a DC-DC converter driving voltage depending on a light source such as a Light Emitting Diode (LED) and supplies current to the light source is used as a vehicular lamp in which a semiconductor light-emitting device such as the LED serves as the light source. Here, when lighting circuits of a plurality of systems are provided, such as a lighting circuit for a high beam LED and a lighting circuit for a low beam LED, for example, a plurality of the DC-DC converters themselves are also provided. In Japanese Patent Application Publication No. 2008-198915 (JP 2008-198915 A), a DC-DC converter (switching regulator) is provided for each of a plurality of light source units.

When a plurality of DC-DC converters are provided in a vehicular lamp or the like, a structure in which these circuits are arranged on a single circuit board is preferable to improve manufacturing efficiency and reduce the size of the overall apparatus. However, when a plurality of DC-DC converters are driven simultaneously, noise generated by the switching circuit of one DC-DC converter may affect the control circuit portion of another DC-DC converter and cause a malfunction. Typically, a circuit element such as a choke coil (a wound element), a transistor (switch element), or a diode (a rectifier element) that form the switching regulator is the noise source. For example, when the switching regulator is driven at a switching frequency of approximately several hundred KHz, a harmonic (for example, several tens to several hundred MHz) is generated by these circuit elements, and this harmonic affects the operation of an IC of the control circuit portion as noise. Also, the emission level of the harmonic noise generated by a plurality of DC-DC converters becomes high, which may also adversely affect other circuits.

SUMMARY OF THE INVENTION

As described above, when a plurality of DC-DC converters are arranged on a single circuit board and these DC-DC converters are driven simultaneously, a malfunction caused by noise may occur, or an emission level of noise may no longer satisfy product standards. Therefore, the invention provides a DC-DC converter and a vehicular lamp capable of suppressing adverse effects due to noise, while arranging a plurality of DC-DC converters on a single circuit board.

A first aspect of the invention relates to a DC-DC converter that includes a plurality of converter portions, each of which includes a switching circuit portion and a control circuit portion, the switching circuit portion being configured to obtain an output voltage by stepping up or stepping down an input voltage with a switching converter circuit including a switch element, a wound element, and a rectifier element, and the control circuit portion being configured to control the output voltage by controlling the switch element of the switching circuit portion. The plurality of converter portions are arranged on a single circuit board such that the switching circuit portion of each of the converter portions is not adjacent to the control circuit portion of each of a rest of the converter portions.

According to this structure, the switching circuit portion of one converter portion is arranged physically separated from the control circuit portion(s) of the other converter portion(s) on the circuit board, so the effect that harmonic noise from the switching circuit portion has on the control circuit portion(s) of the other converter portion(s) is able to be reduced, thus making it possible to inhibit a malfunction from occurring in the control circuit portion. Also, therefore, an additional noise suppression part does not have to be used, so the circuit structure is able to be simplified and the cost can be reduced.

A second aspect of the invention relates to a vehicular lamp that includes a plurality of light source portions and a lighting circuit including a DC-DC converter configured to drive the plurality of light source portions. The DC-DC converter includes a plurality of converter portions, each of which includes a switching circuit portion and a control circuit portion, the switching circuit portion being configured to obtain an output voltage by stepping up or stepping down an input voltage with a switching converter circuit including a switch element, a wound element, and a rectifier element, and the control circuit portion being configured to control the output voltage by controlling the switch element of the switching circuit portion. The plurality of converter portions are arranged on a single circuit board such that the switching circuit portion of each of the converter portions is not adjacent to the control circuit portion of each of a rest of the converter portions.

According to the structure described above, in a vehicular lamp, a lighting circuit is able to be formed using a DC-DC converter in which fewer malfunctions are caused by noise, so stable operation is able to be realized. In addition, effects such as an improvement in manufacturing efficiency and a reduction in the size of the overall apparatus due to mounting a plurality of converter portions on a single circuit board are also able to be obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a DC-DC converter according to one example embodiment of the invention will be described with reference to the accompanying drawings. The DC-DC converter of this example embodiment is used in a lighting circuit of a vehicular lamp. In particular, the lighting circuit is configured as a lighting circuit of a headlamp of a vehicle, that is, as a circuit that drives an LED that serves as a high beam light source and an LED that serves as a low beam light source. The LED is driven by the lighting circuit to emit light. In this case, the vehicular lamp is provided with two independent lighting circuits, i.e., a high beam lighting circuit and a low beam lighting circuit. The vehicular lamp is also provided with two independent DC-DC converters that obtain output voltage to be output to the LEDs. In the description, the two DC-DC converters will be referred to on the whole as a "DC-DC converter" in this example embodiment, and the DC-DC converters will be differentiated by being referred to as "converter portions".

Figure 1:
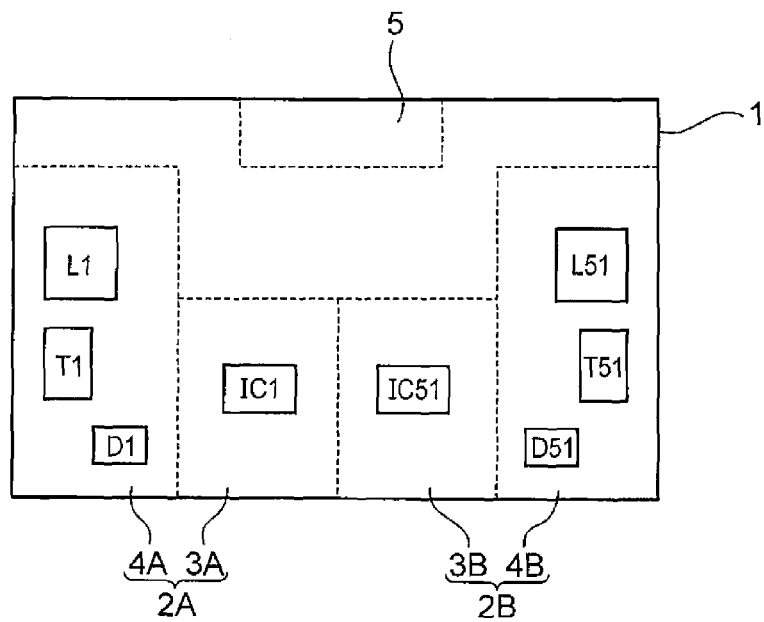
FIG. 1 is an explanatory view schematically showing the arrangement of DC-DC converters according to one example embodiment of the invention on a circuit board.

FIG. 1 is a view showing a frame format of a circuit arrangement state when circuit components of two converter portions are mounted on a circuit board. The specific circuit structure will be described later, but the DC-DC converter of this example embodiment has two converter portions 2A and 2B arranged on a single circuit board 1, as shown in FIG. 1.

The converter portion 2A is formed by a switching circuit portion 4A and a control circuit portion 3A. The switching circuit portion 4A has, as main circuit elements, a transistor T1 (e.g., a Field Effect Transistor (FET)) as a switch element, a choke coil L1 as a wound element, and a diode D1 (e.g., a Shottky barrier diode) as a rectifier element. The switching circuit portion 4A has a circuit structure for obtaining output voltage by stepping up or stepping down input voltage. Also, the control circuit portion 3A controls the output voltage of the switching circuit portion 4A by controlling the on-off state of the transistor T1. This control circuit portion 3A mainly includes an IC (Integrated Circuit) chip IC1 (hereinafter, referred to as "control portion IC1") for performing switching control, and peripheral circuit elements therearound that are not shown.

Similarly, the converter portion 2B is also formed by a switching circuit portion 4B and a control circuit portion 3B. The switching circuit portion 4B has, as main circuit elements, a transistor T51 (e.g., a FET) as a switch element, a choke coil L51 as a wound element, and a diode D51 (e.g., a Shottky barrier diode) as a rectifier element. The switching circuit portion 4B is a circuit structure for obtaining output voltage by stepping up or stepping down input voltage. Also, the control circuit portion 3B controls the output voltage of the switching circuit portion 4B by controlling the on-off state of the transistor T51. This control circuit portion 3B mainly includes an IC chip IC51 (hereinafter, referred to as "control portion IC51") for performing switching control, and peripheral circuit elements therearound that are not shown.

A connector portion 5 is arranged on the circuit board 1. The connector portion 5 includes a required number of terminals used to receive input voltage to the converter portions 2A and 2B, send output voltage to LEDs (not shown), and also send and receive various control signals, and the like.

As shown in FIG. 1, the DC-DC converter of the example embodiment has the converter portions 2A and 2B and the connector portion 5 arranged on the circuit board 1. At this time, the two converter portions (2A and 2B) are arranged on the circuit board 1 such that the switching circuit portion (4A and 4B) of each of the converter portions (2A and 2B) is not adjacent to the control circuit portion (3B and 3A) of the other converter portion (2B and 2A), as is evident from the drawings. That is, the switching circuit portion 4A is not adjacent to the control circuit portion 3B, but is separated from the control circuit portion 3B by an amount corresponding to the region of the control circuit portion 3A. Also, the switching circuit portion 4B is not adjacent to the control circuit portion 3A, but is separated from the control circuit portion 3A by an amount corresponding to the region of the control circuit portion 3B.

Figure 2:
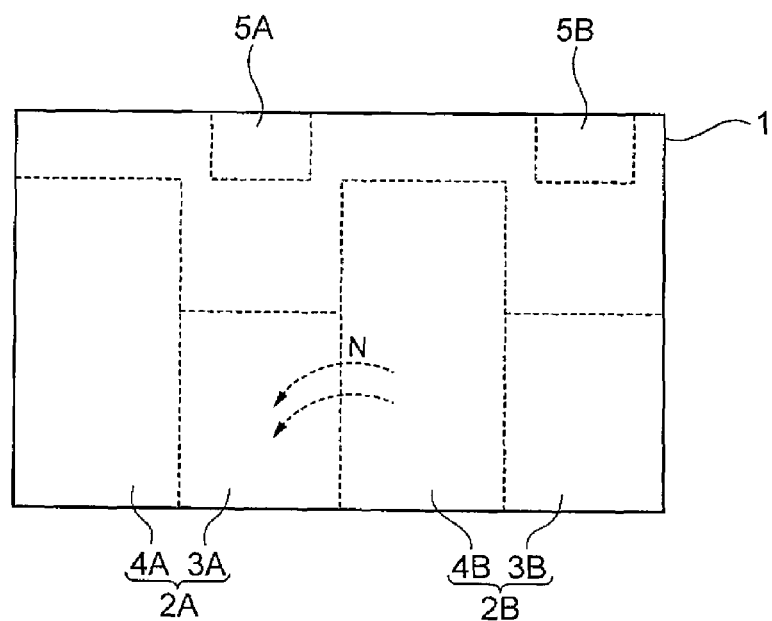
FIG. 2 is an explanatory view of a circuit board arrangement according to a comparative example.

Here, FIG. 2 is a view of an example arrangement of the two converter portions 2A and 2B as a comparative example. This is an arrangement that is typically assumed when the two converter portions 2A and 2B are arranged on a single circuit board 1. That is, it is an example in which patterning and element arrangement of two DC-DC converters are lined up as they are. In the case shown in FIG. 2, the control circuit portion 3A and the switching circuit portion 4B are arranged adjacent to one another. Although not shown in FIG. 2, elements that become noise sources when a switching operation is performed, such as the transistor T51, the choke coil L51, and the diode D51, as described above, are arranged on the switching circuit portion 4B. Therefore, when the converter portions 2A and 2B are operated simultaneously, noise N generated by the switching circuit portion 4B may affect the control portion IC1 of the control circuit portion 3A and cause a malfunction in the control portion IC1.

In contrast, with the DC-DC converter of this example embodiment having an arrangement such as that shown in FIG. 1, the switching circuit portion 4A is not adjacent to the control circuit portion 3B, and the switching circuit portion 4B is not adjacent to the control circuit portion 3A, so the noise N generated by the switching circuit portions 4A and 4B is effectively inhibited from affecting the control circuit portions 3B and 3A. As a result, a malfunction is inhibited from occurring in the control circuit portions 3B and 3A.

Figure 3:
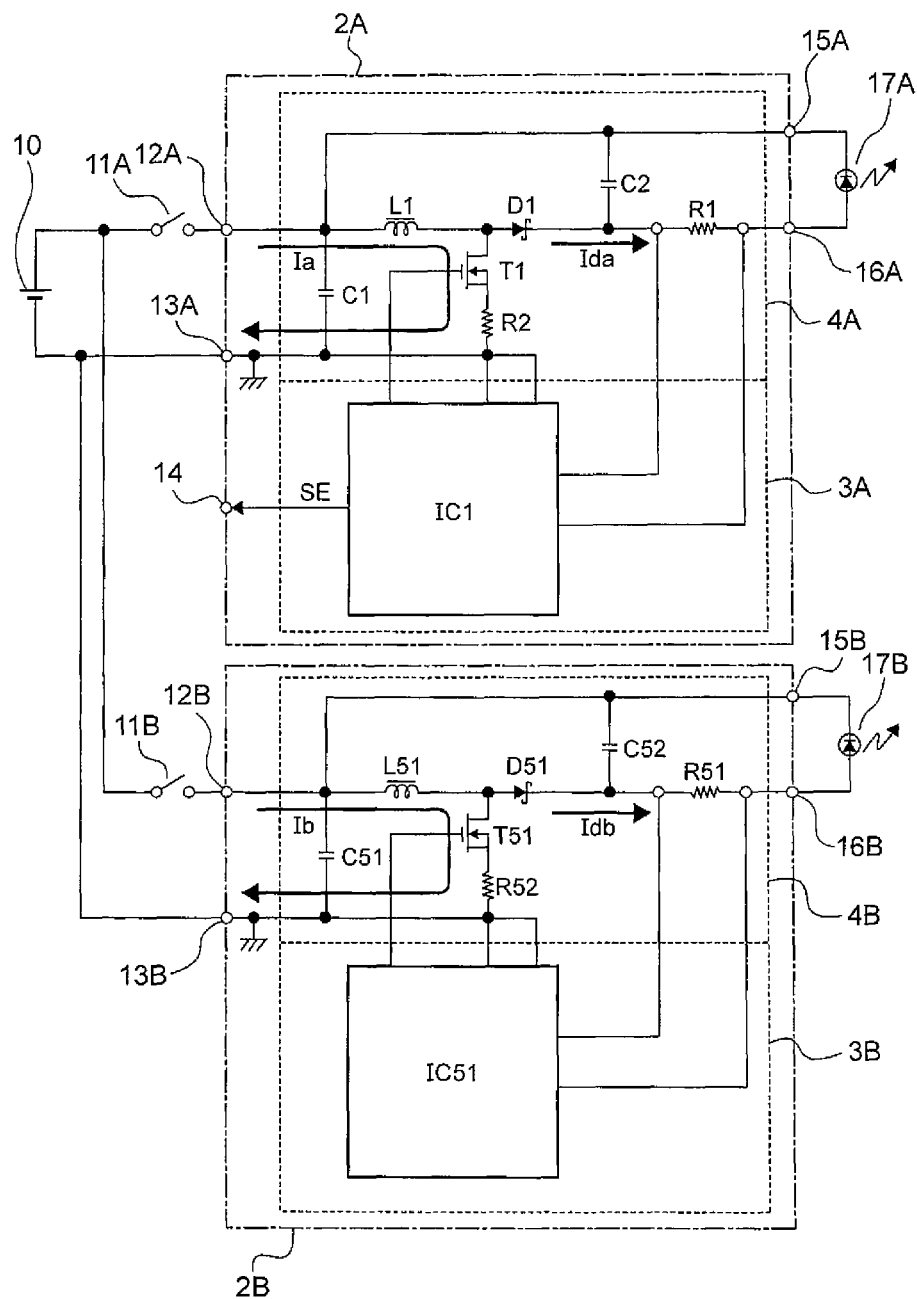
FIG. 3 is a circuit diagram of the DC-DC converters according to the example embodiment.

Next, an example of a circuit structure and element arrangement will be described in more detail with reference to FIGS. 3 and 4. FIG. 3 is a view of a circuit structure that includes the DC-DC converter described above, as a lighting circuit that forms a vehicular lamp. This lighting circuit includes an onboard battery 10, a low beam lighting switch 11A, a high beam lighting switch 11B, the converter portions 2A and 2B, an LED 17A as a low beam light source portion, and an LED 17B as a high beam light source portion. When the low beam lighting switch 11A is turned on, direct current voltage from the onboard battery 10 is input to the converter portion 2A, and the converter portion 2A steps this direct current voltage up or down to obtain a predetermined voltage for lighting the LED as output voltage. A light-emitting driving current is sent to the LED 17A as output of the converter portion 2A to light up the LED 17A. Also, when the high beam lighting switch 11B is turned on, direct current voltage from the onboard battery 10 is input to the converter portion 2B, and the converter portion 2B steps this direct current voltage up or down to obtain a predetermined voltage for lighting the LED as output voltage. A light-emitting driving current is sent to the LED 17B as output of the converter portion 2B to light up the LED 17B. In the drawings, only one of each of the LEDs 17A and 17B is shown for the sake of simplicity, but in actuality, a plurality of LEDs are often connected as light source portions for both low beam and high beam. Naturally, the output voltage of the converter portions 2A and 2B is the required voltage according to the actual load (i.e., the number of connected LEDs and the like).

Terminals 12A and 13A of the converter portion 2A are connected to a positive electrode and a negative electrode of the onboard battery 10 via the low beam lighting switch 11A, and voltage is input from the onboard battery 10. The converter portion 2A has the switching circuit portion 4A and the control circuit portion 3A. A non-isolated type step up choke converter is illustrated as an example of the converter portion 2A (and 2B) in FIG. 3. Therefore, the switching circuit portion 4A of the converter portion 2A is configured such that the choke coil L1, the transistor T1 such as an N-channel Metal-Oxide-Semiconductor Field-Effect Transistor (MOS-FET), the Schottky barrier diode D1, capacitors C1 and C2, and resistors R1 and R2 are all connected, as shown the drawing.

That is, the switching circuit portion 4A is configured such that a current path (input current Ia) is formed by the choke coil L1, a drain-source of the transistor T1, and the resistor R2 being connected in series, between the terminals 12A and 13A. Also, an anode of the Schottky barrier diode D1 is connected to a connection point of the choke coil L1 and the transistor T1, and a cathode of the Schottky barrier diode D1 is connected to a terminal 16A via the resistor R1. The terminals 16A and 15A are connected to an anode and a cathode of the LED 17A. As a result, a light-emitting driving current Ida based on the output voltage from the converter portion 2A is supplied to the LED 17A via the Schottky barrier diode D1 and the resistor R1. The resistor R1 is a current detecting resistor of the light-emitting driving current Ida.

That is, in this switching circuit portion 4A, while the transistor T1 is on, the input current Ia described above flows and electromagnetic energy is stored in the choke coil L1. While the transistor T1 is off, output voltage is obtained by stepping up the voltage, which is achieved by discharging the electromagnetic energy in the choke coil L1. Also, in this switching circuit portion 4A, the light-emitting driving current Ida flows via the Schottky barrier diode D1, and the LED 17A is driven to emit light. The LED 17A is protected from overcurrent by the Schottky barrier diode D1 and the capacitor C2.

The control circuit portion 3A has the control portion IC1, and peripheral circuits that are not shown. The peripheral circuits are a temperature detecting circuit and a protective circuit and the like, for example. The control portion IC1 is formed by a microcomputer, and performs switching control of the transistor T1. That is, the control portion IC1 detects a drop in voltage in the resistor R1, and detects a current value of the light-emitting driving current Ida. The control portion IC1 then realizes a regulation operation of the converter portion 2A by outputting an on-off control signal to a gate of the transistor T1 according to the detected current value. If an abnormality is detected by temperature detection or the like, the control portion IC1 outputs an abnormality signal SE to an electronic control unit (ECU), not shown, from a terminal 14.

The converter portion 2B has a circuit structure substantially similar to the converter portion 2A. The terminals 12B and 13B are connected to the positive electrode and the negative electrode of the onboard battery 10 via the high beam lighting switch 11B, and voltage is input from the onboard battery 10. Similar to the switching circuit portion 4A, the switching circuit portion 4B of the converter portion 2B is configured such that the choke coil L51, the transistor T51 such as an N-channel MOS-FET, the Schottky barrier diode D51, capacitors C51 and C52, and resistors R51 and R52 are all connected, as shown the drawing. That is, a current path (input current Ib) is formed by the choke coil L51, a drain-source of the transistor TM, and the resistor R52 being connected in series, between the terminals 12A and 13A. Also, an anode of the Schottky barrier diode D51 is connected to a connection point of the choke coil L51 and the transistor T51, and a cathode of the Schottky barrier diode D51 is connected to a terminal 16B via the resistor R51. The terminals 16B and 15B are connected to an anode and a cathode of the LED 17B. As a result, a light-emitting driving current Idb based on the output voltage from the converter portion 2B is supplied to the LED 17B via the Schottky barrier diode D51 and the current detecting resistor R51. The stepping-up of the voltage by an on-off operation of the transistor T51 and the output state of the light-emitting driving current Idb are the same as they are in the switching circuit portion 4A.

The control circuit portion 3B has the control portion IC51, and peripheral circuits that are not shown. The control portion IC51 is formed by a microcomputer, and performs switching control of the transistor T51. That is, the control portion IC51 detects a drop in voltage in the resistor R51, and detects a current value of the light-emitting driving current Idb. The control portion IC51 then realizes a regulation operation of the converter portion 2B by outputting an on-off control signal to a gate of the transistor T51 according to the detected current value. The abnormality detection signal SE need only be output from the converter portion 2A side (i.e., the control portion IC1). The control portion IC51 does not need to have an abnormality detection signal outputting function.

Figure 4:
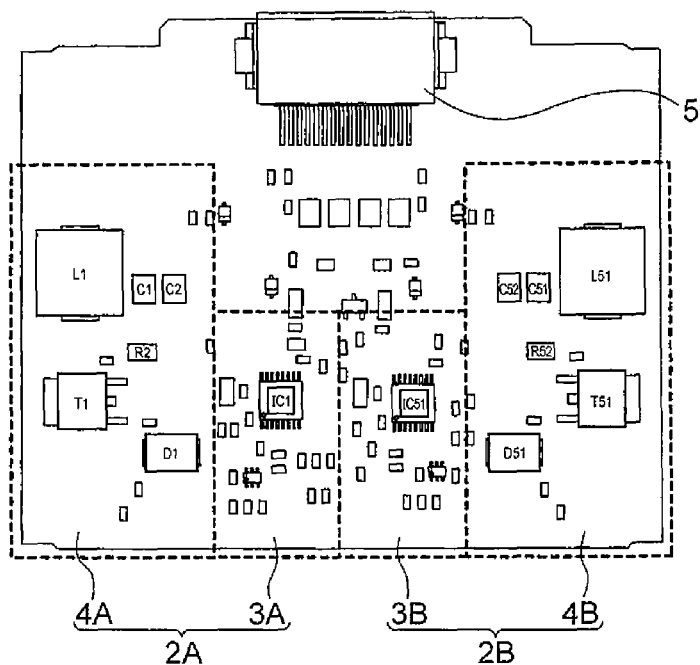
FIG. 4 is an explanatory view of the arrangement of the DC-DC converters according to the example embodiment on a circuit board.

FIG. 4 is a view of the DC-DC converter of this example embodiment that is provided with these kinds of converter portions 2A and 2B arranged on the circuit board 1. In FIG. 4, the circuit elements on the circuit board 1 are shown, and the wiring pattern is omitted. Reference characters corresponding to each of the circuit elements in FIG. 3 are shown in FIG. 4. Just as described with reference to FIG. 1 earlier, the DC-DC converter is such that the two converter portions (2A and 2B) are arranged so that the switching circuit portion (4A and 4B) of each of the converter portions (2A and 2B), as is shown surrounded by a broken line, is not adjacent to the control circuit portion (3B and 3A) of the other converter portion (2B and 2A), on the circuit board 1. That is, the switching circuit portion 4A is not adjacent to the control circuit portion 3B, but is separated from the control circuit portion 3B by an amount corresponding to the region of the control circuit portion 3A. Also, the switching circuit portion 4B is not adjacent to the control circuit portion 3A, but is separated from the control circuit portion 3A by an amount corresponding to the region of the control circuit portion 3B. According to this kind of arrangement, noise generated by the choke coil L1, the transistor T1, and the Schottky barrier diode D1 of the switching circuit portion 4A is inhibited from affecting the control portion IC51 of the control circuit portion 3B. Also, noise generated by the choke coil L51, the transistor T51, and the Schottky barrier diode D51 of the switching circuit portion 4B is inhibited from affecting the control portion IC1 of the control circuit portion 3A. Accordingly, even if both of the converter portions 2A and 2B are driven simultaneously, one or both of the converter portions 2A and 2B is/are able to be inhibited from malfunctioning. Also, two lighting circuits can be formed using a DC-DC converter with fewer malfunctions, so stable operation is able to be realized. In addition, effects such as an improvement in manufacturing efficiency and a reduction in size of the overall apparatus achieved by mounting the plurality of converter portions 2A and 3A on a single circuit board are also able to be obtained. Further, because malfunctions due to noise are able to be inhibited by the arrangement of the converter portions 2A and 2B, there is no longer a need to add a noise suppression part, so a reduction in size, an increase in manufacturing efficiency, and a decrease in cost are also able to be promoted.

Also, in particular, with the arrangement shown in FIG. 4 (FIG. 1), the switching circuit portion 4A, the control circuit portion 3A, the control circuit portion 3B, and the switching circuit portion 4B are arranged lined up in this order in one direction from the left end to the right end of the circuit board 1 in the drawing. With this kind of arrangement, the two switching circuit portions 4A and 4B are positioned at both ends (i.e., one at each end) of the circuit board. The switching circuit portions 4A and 4B that have the choke coils L1 and L51, the transistors T1 and T51, and the Schottky barrier diodes D1 and D51 also generate a relatively large amount of heat. Arranging the switching circuit portion 4A and 4B on the end portions of the circuit board 1 in this way also enables the heat dissipation efficiency to be increased and the structure of the heat dissipating mechanism to be simplified. Moreover, the effect from heat on the control portions IC1 and IC5 is able to be reduced.

Also, the connector portion 5 shown in FIG. 4 is mounted on the circuit board 1 as a connector that has the terminals 12A, 13A, 14, 15A, and 16A, and the terminals 12B, 13B, 15B, and 16B in FIG. 3. That is, in this case, the input and output terminals for the converter portions 2A and 2B can be realized by a single connector component, so effects such as a reduction in the number of parts, improved manufacturing efficiency, and cost reduction are able to be obtained.

Figure 5:
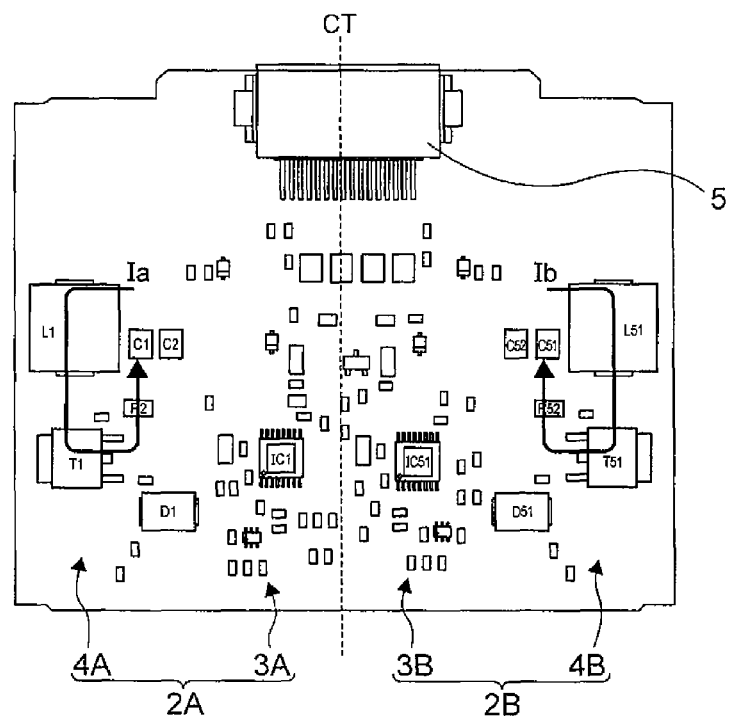
FIG. 5 is an explanatory view of current paths on the circuit board according to the example embodiment.

Also, the parts of the switching circuit portions 4A and 4B in FIG. 4 are arranged symmetrically with respect to a center line (center line CT in FIG. 5). The paths of the input currents Ia and Ib are shown in FIG. 3. These are shown in FIG. 5 from above the circuit board 1. The input current Ia flows along a current path that leads from the choke coil L1 to the resistor R2 via the transistor T1, forming a current loop in the counterclockwise direction on the circuit board as shown in FIG. 5. On the other hand, the input current Ib flows along a current path that leads from the transistor T51 to the resistor R52 via the transistor T51, forming a current loop in the clockwise direction on the circuit board. That is, the current loop formed by the input current Ia of the switching circuit portion 4A, and the current loop formed by the input current Ib of the switching circuit portion 4B rotate in reverse directions to each other. At this time, noise generated by the choke coil L1 and the transistor T1 and noise generated by the choke coil L51 and the transistor T51 cancel each other out. Therefore, a further reducing effect of noise affecting the control portions IC1 and IC51 is able to be obtained, and noise emitted around the circuit board 1 is also able to be reduced, so an adverse effect on peripheral circuits is able to be suppressed.

Figure 6:
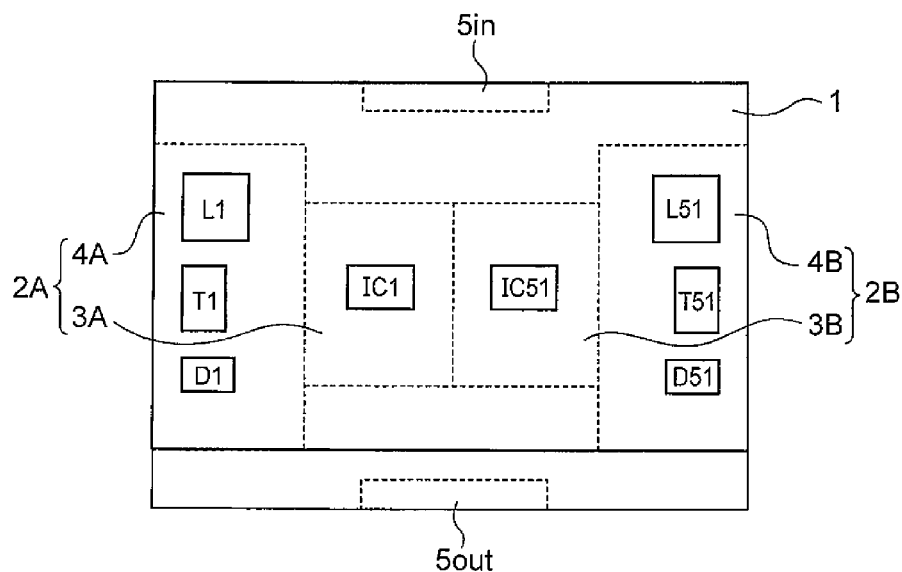
FIG. 6 is an explanatory view schematically showing the arrangement on a circuit board according to another example embodiment of the invention.
Figure 7:
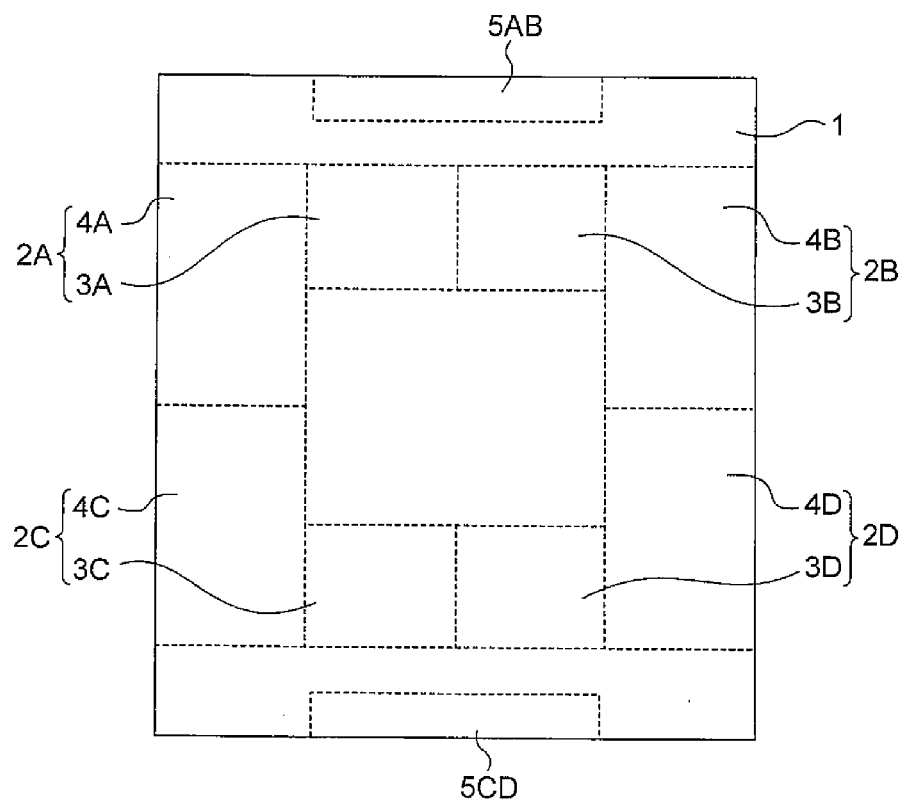
FIG. 7 is an explanatory view schematically showing the arrangement on a circuit board according to yet another example embodiment of the invention.

Heretofore, the DC-DC converter and a lighting circuit of the vehicular lamp according to the example embodiment have been described, but the invention is not limited to this example embodiment. Various other circuit arrangement examples on the circuit board 1 according to the invention are also conceivable. FIGS. 6 and 7 are views illustrating these circuit arrangement examples on the circuit board 1. FIG. 6 is a view of an example in which the switching circuit portion 4A, the control circuit portion 3A, the control circuit portion 3B, and the switching circuit portion 4B are arranged lined up in this order in one direction from the left end to the right end of the circuit board 1 similar to FIG. 4, when arranging the converter portions 2A and 2B. In the example in FIG. 7, two connector portions 5in and 5out are mounted on the circuit board 1. The connector portion 5in is a connector having the terminals 12A, 13A, 12B, and 13B in FIG. 3, for example, i.e., input side terminals, and the connector portion 5out is a connector having the terminals 15A, 16A, 15B, and 16B, for example, i.e., LED side output terminals. Depending on how the circuit board itself is to be mounted in the vehicle, it may be preferable to provide a plurality of the connector portions 5in and 5out, and divide the terminals among the connector portions in this way. With the converter portions 2A and 2B, effects such as inhibiting the malfunctions described above are able to be obtained by this arrangement. It is also possible to provide a plurality of connectors as a converter portion 2A side connector and a converter portion 2B side connector, instead of an input side connector and an output side connector. Moreover, depending on how the circuit board is to be mounted, it is also possible to provide an even larger number of connectors.

Heretofore, the invention has been described with an example in which two converter portions 2A and 2B are mounted on a single circuit board, but it is also conceivable to mount three or more converter portions on a single circuit board. FIG. 7 is a view illustrating an example in which four converter portions 2A, 2B, 2C, and 2D are arranged. As shown in the drawing, a connector portion 5AB is arranged on an upper end, in the drawing, of the circuit board 1, and the switching circuit portion 4A and the control circuit portion 3A of the converter portion 2A, and the control circuit portion 3B and the switching circuit portion 4B of the converter portion 2B, are arranged lined up in this order from the left end to the right end in an upper half region of the circuit board 1. The control circuit portions 3A and 3B are arranged in a region as close to the upper end as possible. The connector portion 5AB has input and output terminals of the converter portions 2A and 2B. Also, the switching circuit portion 4C and the control circuit portion 3C of the converter portion 2C, and the control circuit portion 3D and the switching circuit portion 4D of the converter portion 2D, are arranged lined up in this order from the left end to the right end in a lower half region of the circuit board 1. The control circuit portions 3C and 3D are arranged in a region as close to the lower end as possible. A connector portion 5CD is arranged on the lower end of the circuit board 1. The connector portion 5CD has input and output terminals of the converter portions 2C and 2D.

With this kind of arrangement, the converter portions 2A, 2B, 2C, and 2D are able to be arranged such that the switching circuit portion (4A, 4B, 4C, and 4D) of one converter portion is not adjacent to the control circuit portion (3A, 3B, 3C, and 3D) of each of the rest of the converter portions. That is, the switching circuit portion 4A is not adjacent to the control circuit portion 3B, 3C, or 3D. Also, the switching circuit portion 4B is not adjacent to the control circuit portion 3A, 3C, or 3D. The switching circuit portion 4C is not adjacent to the control circuit portion 3A, 3B, or 3D. The switching circuit portion 4D is not adjacent to the 3A, 3B, or 3C. Therefore, even if two or more of these converter portions 2A, 2B, 2C, and 2D are operating simultaneously, noise from one switching circuit portion is able to be inhibited from affecting a control circuit portion of another converter portion and causing a malfunction. Here, four converter portions are given as an example, but various arrangement examples according to the invention are also conceivable when three or five or more converter portions are arranged on a single circuit board.

Also, in the example embodiment described above, an example is described in which a converter portions of a low beam lighting circuit and a high beam lighting circuit of a headlamp as a vehicular lamp are arranged on a single circuit board, but the invention may also be applied to a case in which a plurality of DC-DC converters of lighting circuits of various kinds of lamps, such as a stop and tail lamp, a fog lamp, a turn signal lamp, or a small lamp, for example, are arranged on a single circuit board.

Also, an example of a step up type converter is illustrated in FIG. 3, but the invention may of course also be applied to a step down type converter or a step up/down type converter. Furthermore, the invention may also be applied to a case of a DC-DC converter using a transformer instead of a choke coil as a wound element. That is, the invention may also be applied to various types of switching DC-DC converters that control the output voltage by controlling a switch element. Also, the invention is not limited to a lighting circuit of a vehicular lamp, but may widely be applied as technology when arranging a plurality of DC-DC converters on a single circuit board.

As described above, a DC-DC converter according to the invention includes a plurality of converter portions, each of which includes a switching circuit portion and a control circuit portion, and the plurality of converter portions are arranged on a single circuit board such that the switching circuit portion of each of the converter portions is not adjacent to the control circuit portion of each of a rest of the converter portions.

The DC-DC converter may include as the plurality of converter portions a first converter portion including a first switching circuit portion and a first control circuit portion, and a second converter portion including a second switching circuit portion and a second control circuit portion. In this case, the first converter portion and the second converter portion may be arranged on the circuit board such that the first switching circuit portion and the second control circuit portion are not adjacent to each other, and the second switching circuit portion and the first control circuit portion are not adjacent to each other.

According to this structure, when the first and second converter portions are mounted on a single circuit board, the effect that harmonic noise from the switching circuit portion has on the control circuit portion of another of the converter portions is able to be reduced, thus making it possible to inhibit a malfunction from occurring.

The first switching circuit portion, the first control circuit portion, the second control circuit portion, and the second switching circuit portion may be arranged lined up in order of the first switching circuit portion, the first control circuit portion, the second control circuit portion, and the second switching circuit portion in one direction on the circuit board.

According to this structure, the first switching circuit portion and the second switching circuit portion that generate a large amount of heat are able to be arranged farthest away from each other on both end portions of the circuit board, which facilitates the dissipation of heat, improves efficiency, and reduces the thermal effect on the control circuit portion.

Each of the first switching circuit portion and the second first switching circuit portion may include as circuit elements the switch element, the wound element, and the rectifier element. Here, the circuit elements of the first switching circuit portion and the circuit elements of the second switching circuit portion may be arranged such that a path of an input current that flows through the switch elements of the first switching circuit portion and a path of an input current that flows through the switch elements of the second switching circuit portion rotate in reverse directions on a plane surface of the circuit board.

According to this structure, the input current path that flows through the switch elements of the first switching circuit portion and the input current path that flows through the switch elements of the second switching circuit portion rotate in the reverse directions to each other on a plane surface of the circuit board, which enables noise generated in one switching circuit portion to cancel out noise generated in the other switching circuit portion, and enables the noise emitted into and out of the DC-DC converter to be reduced.

What is claimed is:

1. A vehicular lamp comprising:
a plurality of light source portions; and
a lighting circuit including a DC-DC converter configured to drive the plurality of light source portions, wherein:
the DC-DC converter includes a plurality of converter portions, each of which includes a switching circuit portion and a control circuit portion, the switching circuit portion being configured to obtain an output voltage by stepping up or stepping down an input voltage with a switching converter circuit including a switch element, a wound element, and a rectifier element, and the control circuit portion being configured to control the output voltage by controlling the switch element of the switching circuit portion;
the plurality of converter portions are arranged on a single circuit board such that the switching circuit portion of each of the converter portions is not adjacent to the control circuit portion of each of a rest of the converter portions; and
in each of the converter portions, (i) the switching circuit portion is arranged at an end portion of the circuit board, and (ii) the switching circuit portion is arranged outward of the control circuit portion in the circuit board.

2. The vehicular lamp according to claim 1, wherein:
the DC-DC converter includes as the plurality of converter portions a first converter portion including a first switching circuit portion and a first control circuit portion, and a second converter portion including a second switching circuit portion and a second control circuit portion; and
the first converter portion and the second converter portion are arranged on the circuit board such that the first switching circuit portion and the second control circuit portion are not adjacent to each other, and the second switching circuit portion and the first control circuit portion are not adjacent to each other.

3. The vehicular lamp according to claim 2, wherein the first switching circuit portion, the first control circuit portion, the second control circuit portion, and the second switching circuit portion are arranged lined up in order of the first switching circuit portion, the first control circuit portion, the second control circuit portion, and the second switching circuit portion in one direction on the circuit board.

4. The vehicular lamp according to claim 2, wherein:
each of the first switching circuit portion and the second first switching circuit portion includes as circuit elements the switch element, the wound element, and the rectifier element; and
the circuit elements of the first switching circuit portion and the circuit elements of the second switching circuit portion are arranged such that a path of an input current that flows through the switch elements of the first switching circuit portion and a path of an input current that flows through the switch elements of the second switching circuit portion rotate in reverse directions on a plane surface of the circuit board.

* * * * *